United States Patent
Takemoto (10) Patent No.: US 6,624,906 B1
(45) Date of Patent: Sep. 23, 2003

(54) IMAGE FORMING APPARATUS

(75) Inventor: Motomi Takemoto, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/219,533

(22) Filed: Dec. 23, 1998

(30) Foreign Application Priority Data

Dec. 26, 1997 (JP) ............................................. 9-360776
Nov. 27, 1998 (JP) ........................................... 10-337746

(51) Int. Cl.[7] ............................................. G06K 15/00
(52) U.S. Cl. ..................................... 358/1.14; 358/1.15
(58) Field of Search ............................... 358/1.15, 1.14, 358/468, 401, 471

(56) References Cited

U.S. PATENT DOCUMENTS

| | | | | |
|---|---|---|---|---|
| 4,673,990 A | * | 6/1987 | Okada | 358/296 |
| 5,034,780 A | * | 7/1991 | Kotabe | 355/316 |
| 5,206,735 A | | 4/1993 | Gauronski et al. | 358/296 |

FOREIGN PATENT DOCUMENTS

| | | | | |
|---|---|---|---|---|
| JP | 8-337331 | | 12/1996 | B65H/3/41 |
| JP | 11150621 | * | 6/1999 | H04N/1/00 |

* cited by examiner

*Primary Examiner*—Jerome Grant, II
(74) *Attorney, Agent, or Firm*—Burns, Doane, Swecker & Mathis, LLP (57) ABSTRACT

An image forming apparatus has an output unit for outputting image data stored in a memory. This image forming apparatus is capable of accepting a new data-output request for other image data during the output operation of the former image data. The image forming apparatus also has a built-in input unit provided in the image forming apparatus and supplying image data to the memory, an external input device for inputting image data supplied from an external apparatus, and a controller for prohibiting a new data-output request in a specific operation mode when image data supplied from the external input device is to be output in the same specific operation mode.

21 Claims, 12 Drawing Sheets

FIG.12

IMAGE FORMING APPARATUS

This application claims priority to Japanese Patent Applications Nos. H9(1997)-360776 filed on Dec. 26, 1997 and H10(1998)-337746 filed on Nov. 27, 1998, each disclosure of which is incorporated by reference in its entirety.

BACKGROUND OF THE INVENTION

1. Field of the Invention

This invention relates to an image forming apparatus, including a digital photocopy machine, which can receive image data from external apparatuses, such as computers or facsimile machines, and output recorded images, and more particularly, to an image forming apparatus having multiple functions for receiving image data from external apparatuses and executing the printing operation for that image data independently of the operations of the input/output units of the image forming apparatus itself.

2. Description of the Related Art

A good example of the conventional multi-function image forming apparatus is a photocopier which has a manual paper-supply port, and execute printing operations in the manual paper-supply print mode based on the user's selection of the manual paper-supply port, or on the instruction from an external computer.

The manual paper-supply port can receive many different types and sizes of papers, and the user can set a desired size and type of paper in this manual paper-supply port. There are two types of manual paper-supply port, a single paper setting type and a multiple paper setting type. With the single paper setting type, insertion of a single paper is detected, and upon the detection, the paper is supplied to the paper transportation path. With the multiple paper setting type, a plurality of paper can be set in the port at a time, and the papers are successively supplied by manipulating the print start key.

However, in the conventional multi-function image forming apparatus, a print request in the manual paper-supply mode demanded by the built-in input unit (e.g., the image reader or the scanner) is given priority. If there is a print request from an external apparatus in the manual paper-supply mode, and if a new photocopy request in the manual paper-supply mode is made by the built-in input unit of the photocopier itself before the print request from the external apparatus has been executed, the print request from the external apparatus is canceled. Accordingly, if manual-mode print requests from the built-in input means frequently arise in the image forming apparatus, those print requests supplied from external computers can not be promptly accepted. Thus, the printing operations for external computers are often delayed, which deteriorates the operability of both the external computers and the image forming apparatus itself.

This problem could be solved by the multiple paper setting type paper-supply port. With this type of manual paper-supply port, the print request in the manual paper-supply mode sent from an external computer is incorporated into the common waiting matrix which is used for the ordinary print request, and the manual-mode print request from the external computer is executed when its turns comes, while the desired paper is supplied from the manual paper-supply port. However, with this technique, the paper accommodated in the manual paper-supply port is often changed with other types or sizes of papers before the print request from the external computer is actually executed. In this case, the image data may be printed on a different size or type of paper.

SUMMARY OF THE INVENTION

Therefore, it is an object of the invention to provide an multi-function image forming apparatus which can promptly and correctly execute a print request in a specific mode (for example, a manual paper-supply print mode) supplied from an external apparatus, such as a personal computer.

It is another object of the invention to provide a multi-function image forming apparatus which can improve the operability of the image forming apparatus itself, as well as the operability of the external computer connected to the image forming apparatus.

In order to achieve these objects, an image forming apparatus which is capable of accepting a new image data-output request during an output operation of image data stored in a memory is provided. This image forming apparatus comprises a memory for storing image data, an output device for outputting the image data stored in the memory, a built-in input device for inputting image data to the memory, an external input device for inputting image data supplied from an external apparatus to the memory, and a controller for prohibiting an acceptance of a new data-output request in a specific operation mode when image data supplied from the external input device is to be output in said specific operation mode.

With this arrangement, if the image forming apparatus is in the state that the image data supplied from the external input device is to be output in the specific operation mode, any new data-output request in the same operation mode is not accepted until the current output operation has been completed. Therefore, the current output job is not interrupted. The new output request is then promptly accepted upon completion of the current job.

The controller judges whether a current data-output request supplied from said external input device is in the specific operation mode, and determines to prohibit the acceptance of the new data-output request if the current data-output request is in the specific operation mode. Thus, the acceptance of the new output (or print) request is prohibited based on the operation mode designated by the external input device.

The image forming apparatus may further comprises a manipulation designation key for designating current data-output_request to be in the specific operation mode. In this case, the controller determines that the current data-output request is in the specific mode based on the state of the manipulation designation key. Thus, the acceptance of the new print request is prohibited by the manipulation of the key on the image forming apparatus itself.

Preferably, the output device is a printer for forming an image on a sheet. The specific operation mode is, for example, a manual paper-supply mode which uses a specific paper-supply port in which a desired size of paper can be inserted.

Thus, a print request in the manual paper-supply mode input from an external apparatus can be promptly accepted and executed. This arrangement can practically improve the output operation for the image data supplied from the external apparatus.

BRIEF DESCRIPTION OF THE DRAWINGS

The above and other objects, features, and advantages of the present invention will be apparent from the following detailed description of the preferred embodiments with reference to the attached drawings, wherein.

DETAILED DESCRIPTION OF THE PREFERRED EMBODIMENT

Figure 1:
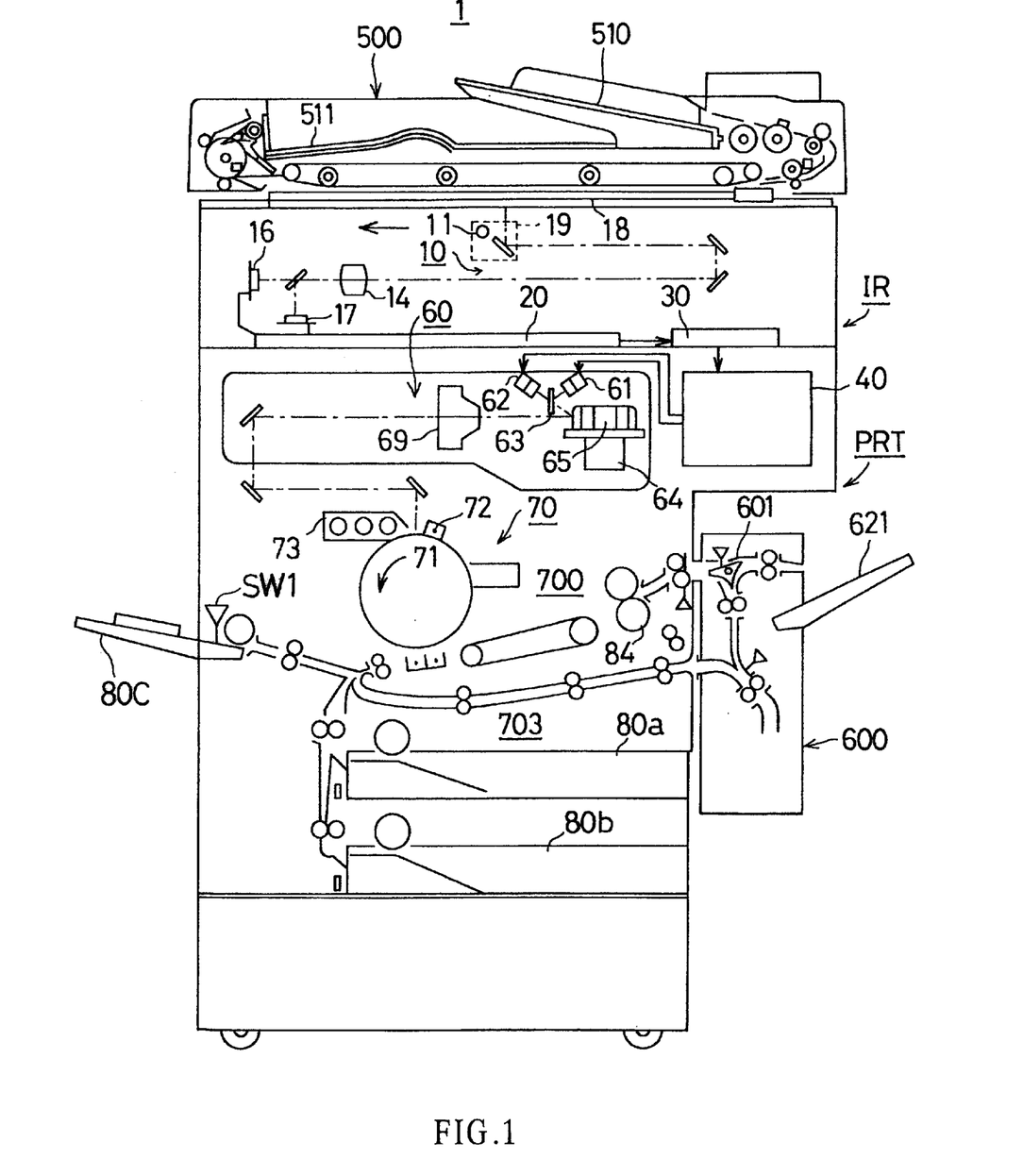
FIG. 1 is a cross-sectional front view of the image forming apparatus according to an embodiment of the invention.

FIG. 1 is a cross-sectional front view of a digital photocopy machine 1, which is an example of the image forming apparatus according to an embodiment of the invention.

The photocopy machine 1 comprises a scan mechanism 10 for scanning the original and generating image signals, an image signal processor 20 for processing the image signals supplied from the scan system to generate image data, and an image memory 30 for storing the image data supplied from the image signal processor 20. The image memory 30 supplies the image data to an print processor 40, which then drives two semiconductor lasers 61 and 62 based on the image data. An optical system 60 guide the two laser beams emitted by the semiconductor lasers 61 and 62 onto different exposure positions on a photoreceptor drum 71, and forms a latent image. An image recording system 70 develops the latent image formed by the exposure, transfers the developed image onto a paper, and fixes the image on the paper. The image forming apparatus also has an original-feeding system 500 for feeding the original and turning it over if necessary, and a paper-resupply unit 600 for returning the paper, on which an image has been recorded on one face, to the image-transfer position.

The scan mechanism 10 and the image signal processor 20 comprise a scanner IR which serves as built-in input means. The printing processor 40, the optical system 60, and the image recording system 70 comprise a printer PRT.

The scanner IR first scans the original placed on the original stage glass 18 with the face down. To be more precise, the image on the original is successively exposed to the beam emitted by an exposure lamp 11 which is fixed to a carriage 19 and moves across the original below the glass stage 18. The beam reflected by the original is guided, via collective lens 14, to the photoelectric converting devices 16 and 17 using CCD arrays. The photoelectric converting devices 16 and 17 convert the light into electric signals, which are then supplied to the image signal processor 20.

The original-feeding system 500 automatically feeds the original inserted in the original supply tray 510 onto the glass stage 18, and after the original has been scanned by the scanner IR, it automatically ejects the original onto the ejection tray 511.

The data read by the scanner IR is stored in the image memory 30.

In operations of the printer PRT, the printing processor 40 causes the semiconductor lasers 61 and 62 to emit laser beams, based on the signals supplied from the image memory 30. The laser beams are combined together by the dichroic mirror 63, and reflected by the polygonal mirror 65 which is rotated by a motor 64. The reflected beam is guided onto the photoreceptor 71 via a primary lens.

The photoreceptor 71 has been charged by a charger 72. If the laser beams strike the charged photoreceptor 72, a latent image is formed on the photoreceptor 71. A developer 73 sprays toner onto the latent image, whereby a toner image is formed on the photoreceptor 71. The toner image is transferred onto a copy paper supplied from the cassette 80a or 80b, and thermally fixed to the paper with a pressure by an image fixing unit 84. Finally, the paper, on which the image is recorded, is ejected onto the ejection tray 621.

A manual paper-supply port 80c is provided, in addition to the paper-supply cassettes 80a and and 80b. The user can set desired sizes and types of papers in the manual paper-supply port 80c. In this example, if the insertion of a single paper is detected by the detection switch SW1, the detected paper is supplied to the paper transportation path, and the printer is activated.

As an alternative, the manual paper-supply port may be designed so as to receive a plurality of papers at a time, and to successively supply the papers in response to the manipulation of the print start key or the print request input from an external apparatus.

Figure 2:
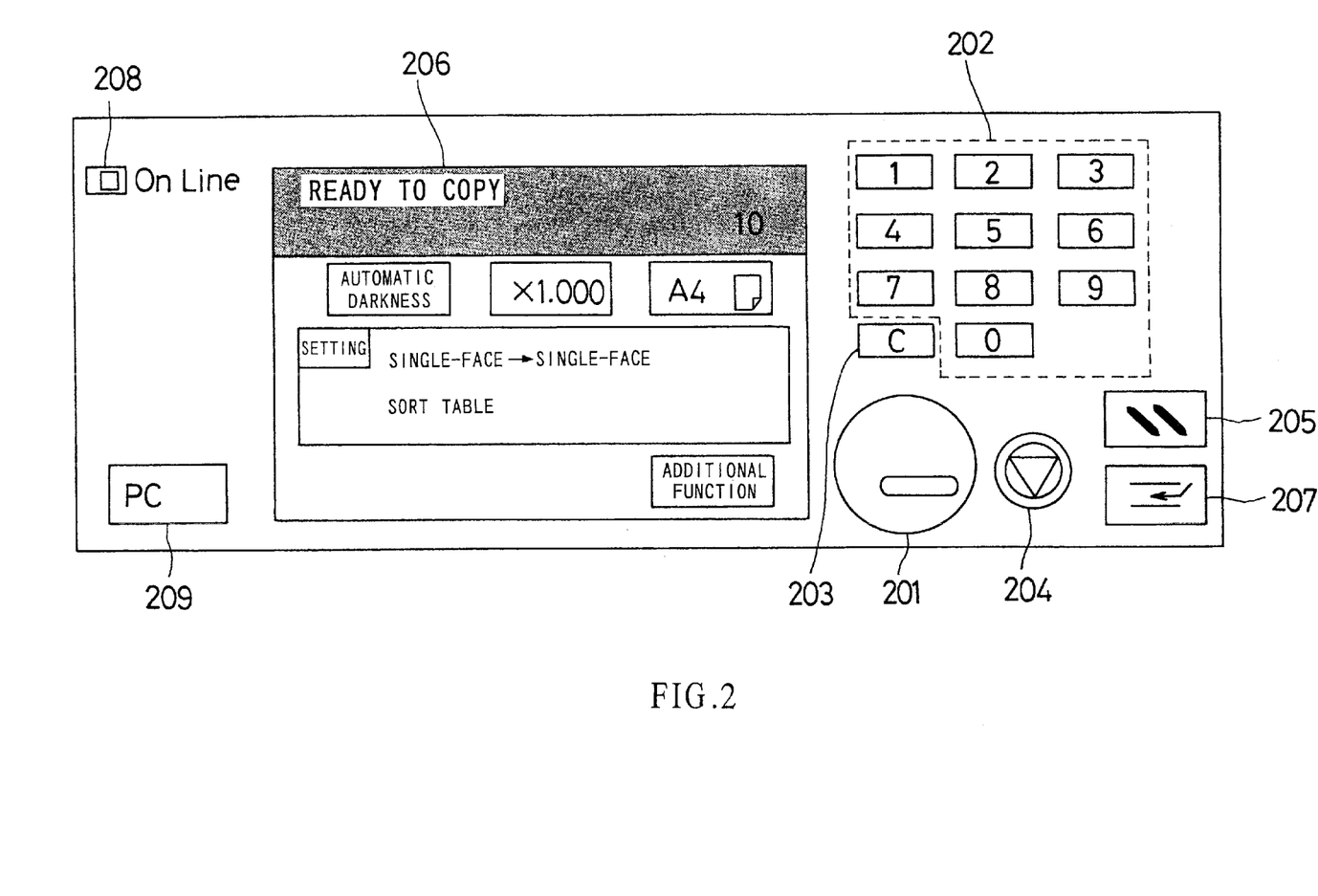
FIG. 2 is a front view of the operation panel of the image forming apparatus shown in FIG. 1.

FIG. 2 is a front view of the operation panel of the image forming apparatus shown in FIG. 1.

On the panel, a start key 201 for starting the print operation, a ten key pad 202 for inputting numerical values (e.g., the number of copies), a clear key 203 for clearing the inputted numerical value or discarding the image data in the image memory 30, a stop key 204 for stopping the print operation, and a panel reset key 205 for resetting the mode and the job currently selected, are provided. An LCD 206 displays various modes. The LCD 206 is covered with a touch panel, through which a user can set a desired mode following the display. An interruption key 207 allows the current job to be interrupted by other job. An on-line key 208 switches the data-accepting states for those jobs requested by external computers. The on-line key 208 has an LED for indicating the ON state (i.e., the acceptable state) for the data transfer from an external computer, and the LED flashes if the data is being received (i.e., in the ON state). A PC key 209 allows a user to set various parameters for a PC job, which is a job requested by the external computer.

Figure 3:
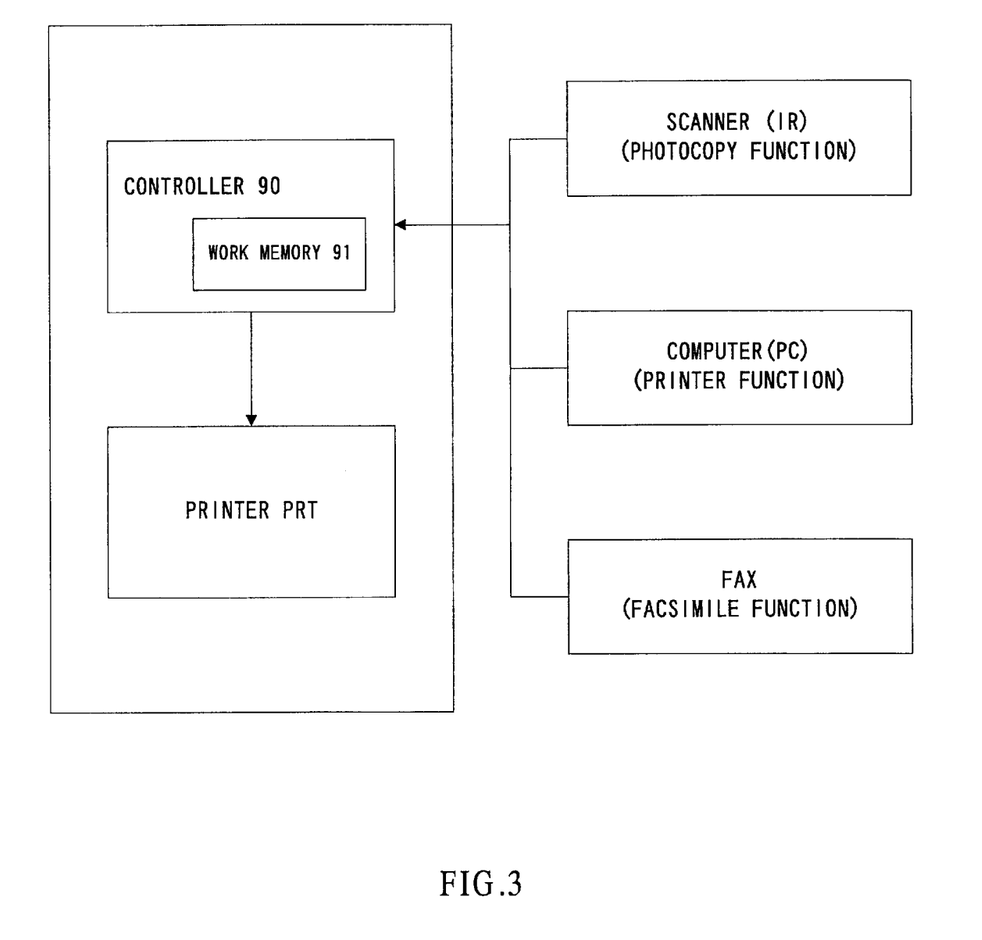
FIG. 3 shows the multiple functions of the image forming apparatus.

The image forming apparatus shown in FIGS. 1 and 2 has a multi-function mechanism and a multi-job mechanism. FIG. 3 illustrates multiple functions of the image forming apparatus.

In general, a multi-function mechanism allows a printer PRT to receive various formats of image data from a plurality of built-in input units and external apparatuses, such as a scanner IR, a personal computer PC, a facsimile machine (FAX), etc. These input means are controlled by a controller 90 which has a work memory 91 for identifying the types of the job types. The controller 90 identifies the data source (i.e., the input means), from which the job request is supplied, and registers the job and the data source in the work memory 91. The work memory 91 stores all types of jobs registered, and successively erases job information when each job has been completed.

In this context, the "job" is a printing task performed in a single print request with respect to one or more image data input from the external apparatus vis the external input device, or input from the built-in input unit.

Figure 4:
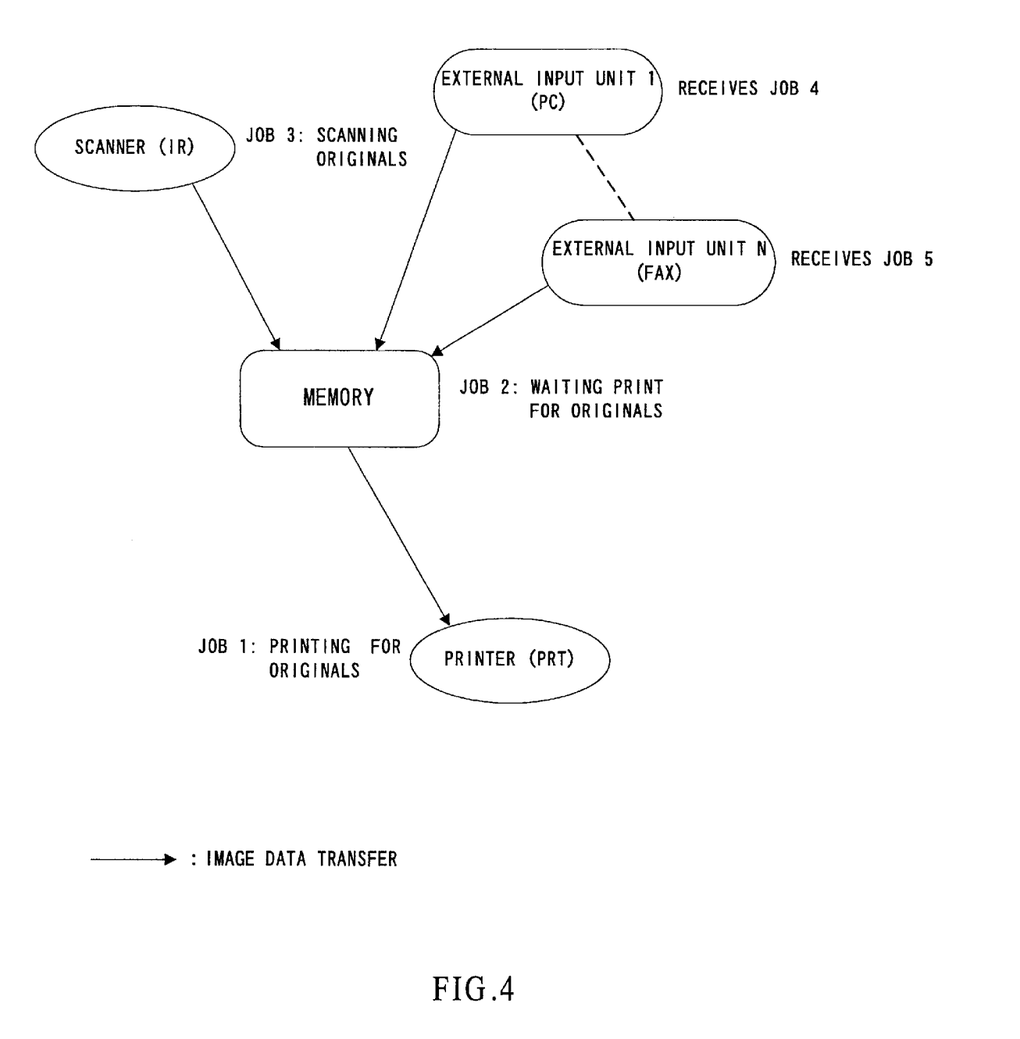
FIG. 4 shows the multiple functions and the multiple jobs of the image forming apparatus.

FIG. 4 illustrates the outline of the multi-function/multi-job operation.

The multi-job operation allows a plurality of jobs to be accepted during the printing operation. For example, the image data of a new job can be input to the image memory, while other image data is read out from the image memory and is printed out. If a plurality of jobs are accepted, they are successively read out from the image memory, and are printed out.

With an image forming apparatus (e.g., a digital photocopy machine) having an image data, the multi-function/multi-job operation allows a new set of original image to be stored in the image memory based on the print reservation through the operation panel, the scan of the original image by the scanner IR, or the input of the new image data from the external computer, while the printer PRT is outputting the recorded image of the previous original from image memory.

For example, as shown in FIG. 4, while the job 1 for the original is being printed out from the printer PRT, one of the jobs 3 through 5 (the job 3 for the newly scanned original, and the jobs 4 and 5 required by the external computer and the facsimile machine) is stored in the memory. Thus, the printing operation and the data storage in the memory are independently performed.

Figure 5:
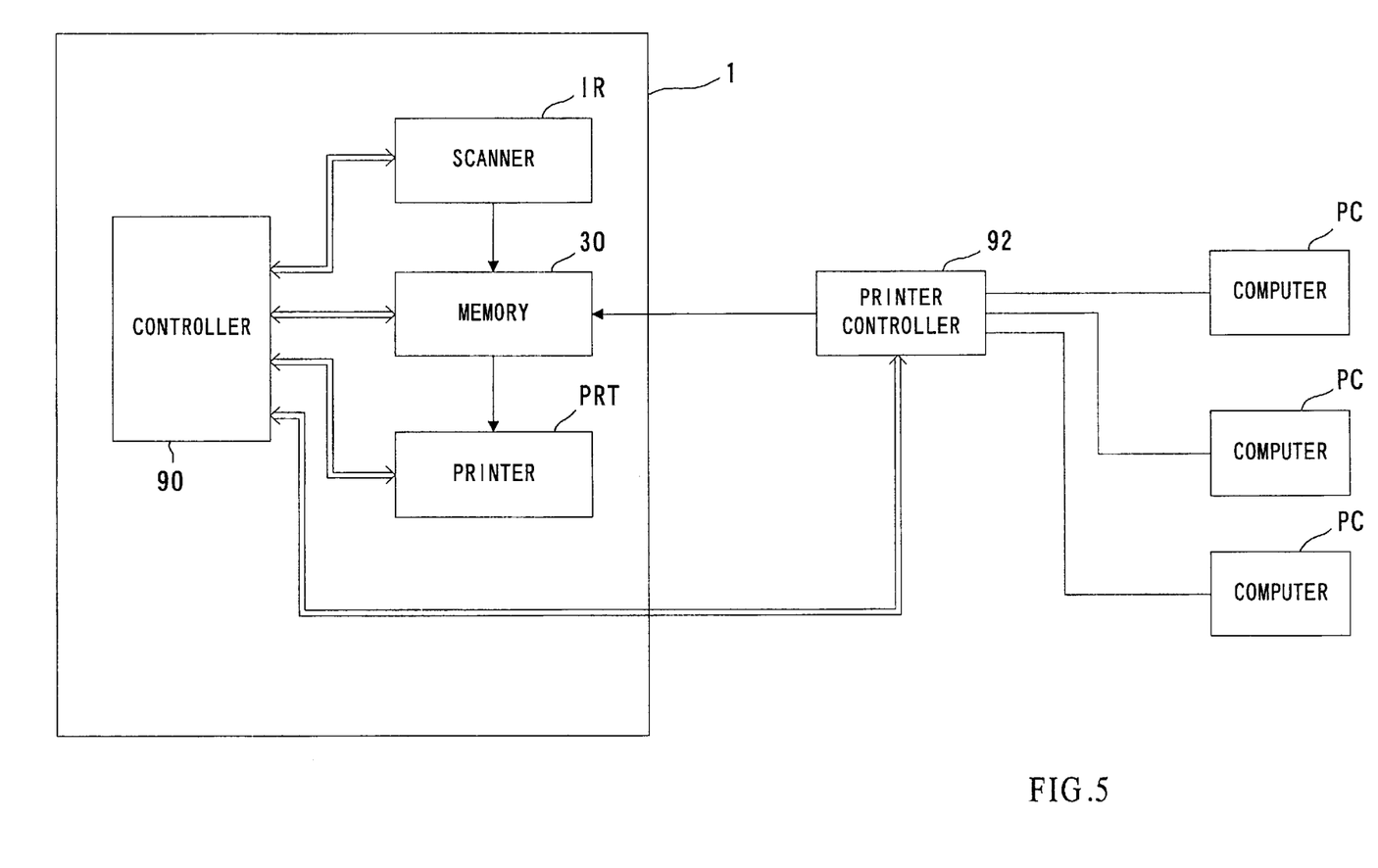
FIG. 5 is a block diagram showing the connection between photocopy machine according to an embodiment of the invention and external computers.

FIG. 5 is a block diagram of the system for achieving the multi-function/multi-job operation. In this embodiment, a plurality of computers (PCs), which are external apparatus, are connected to the photocopy machine 1 via the printer controller 92 (i.e., the external input device) for controlling the printing jobs of these computers. The printer controller 92 receives a print data and a control data from the computers Pcs, and changes the print data into an image data. Then the image data is sent to an image memory 30. The control data is sent to the controller 90 and transmits a signal thereto. The photocopy machine 1 has a built-in scanner (or input means) IR, the image memory 30, and a printer PRT. These elements are the same as those shown in FIG. 1. The controller 90 is also the same as that shown in FIG. 3, and is activated by the CPU. The controller 90 controls the image memory 30, the printer PRT, and the printer controller 92.

Facsimile machines can also be connected as the external apparatus to the image forming apparatus. In this case, a modem is use as the external input device, in place of the printer controller 92. If other photocopy machines or image readers are connected as external apparatus to the photocopy machine 1, only an external interface is provided as the external input device because the image data are supplied directly from these external apparatuses.

Figure 6:
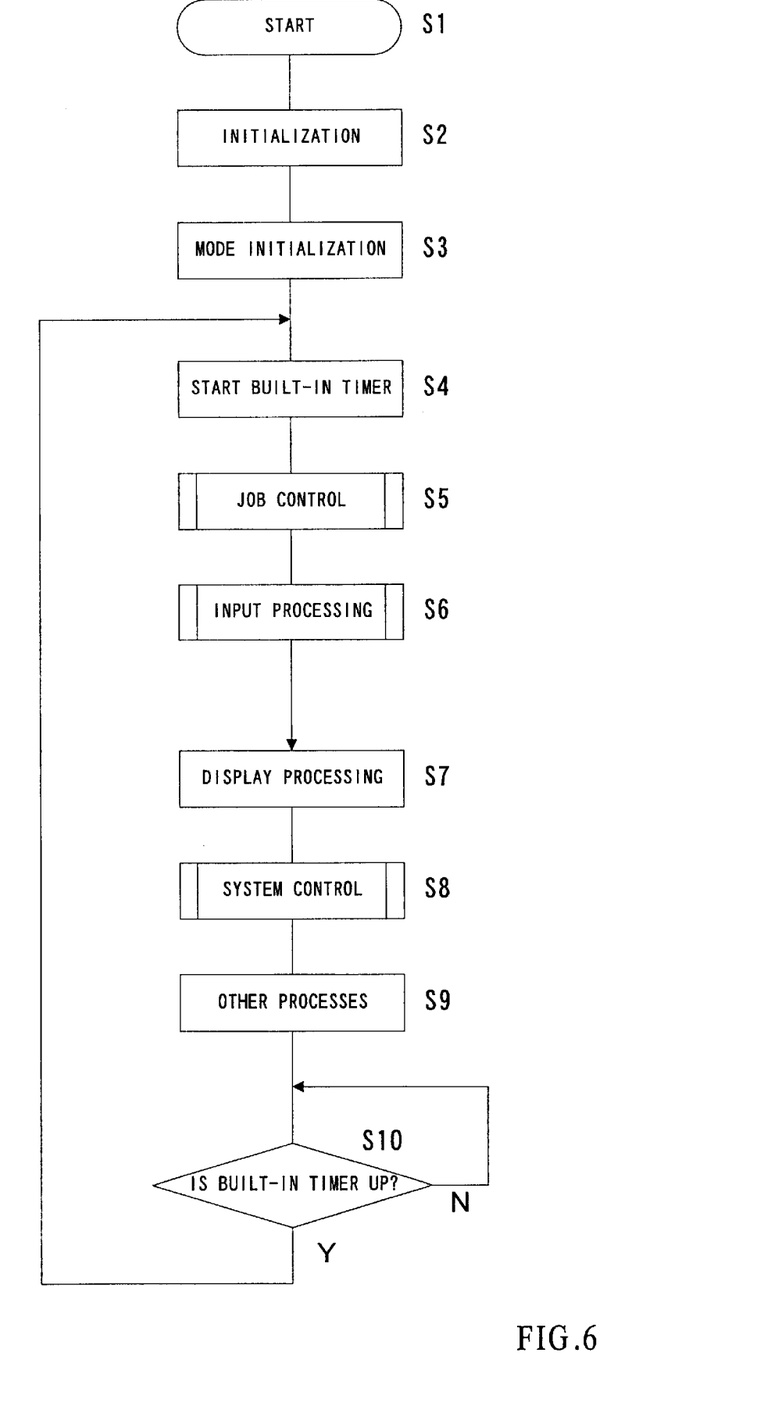
FIG. 6 is a flowchart showing the main routine of the CPU for controlling the overall operations of the image forming apparatus.

FIG. 6 is a flowchart of the main routine executed in the controller 90 by the CPU which controls the entire operation of the photocopy machine 1. In the following description and the attached drawings, S stands for a step, Y stands for YES, and N stands for NO.

In S1, the program starts upon the rest of the CPU. In S2, initialization is performed. For example, the RAM is cleared, and the various registers are set up in the initialization. Then, the mode of the photocopy machine 1 is initialized in S3. At this time, the initial value of the job number is set to 1.

Then, the loop of the main control starts. In S4, the built-in timer installed in the CPU is started. The initial value of the timer has already been set in the initialization (S2). In S5, the control state of the current print job is determined. This process is referred to as job control. In the sub-routine of the job control, the type of the current job being required by the user is determined, and this determination result is displayed on the operation panel.

In S6, inputs from the hard keys or the touch panel provided to the main body of the photocopy machine are processed. This process is referred to as input processing. The sub-routine of the input processing (S6) will be described in detail below.

In S7, display processing for the LCD and the LED is executed. In S8, the print operations of the main body of the photocopy machine are controlled. This process is referred to as system control, and the sub-routine of this process will also be described below. Then, other processes are performed in S9.

When all the sub-routines in this routine are completed, it is determined in S10 if the built-in timer started in S4 is up. If the time is up (i.e., YES in the determination of S10), a cycle of routine has been completed, and the process returns to S4. The length of a cycle of routine is used to count various timers used in the sub-routines. (The values of the respective timers indicate how may times the routine has been repeated, and the completion of these timers are determined based on the their values.) If the built-in timer has not been up (i.e., NO in S10), the process remains in S10.

Figure 7:
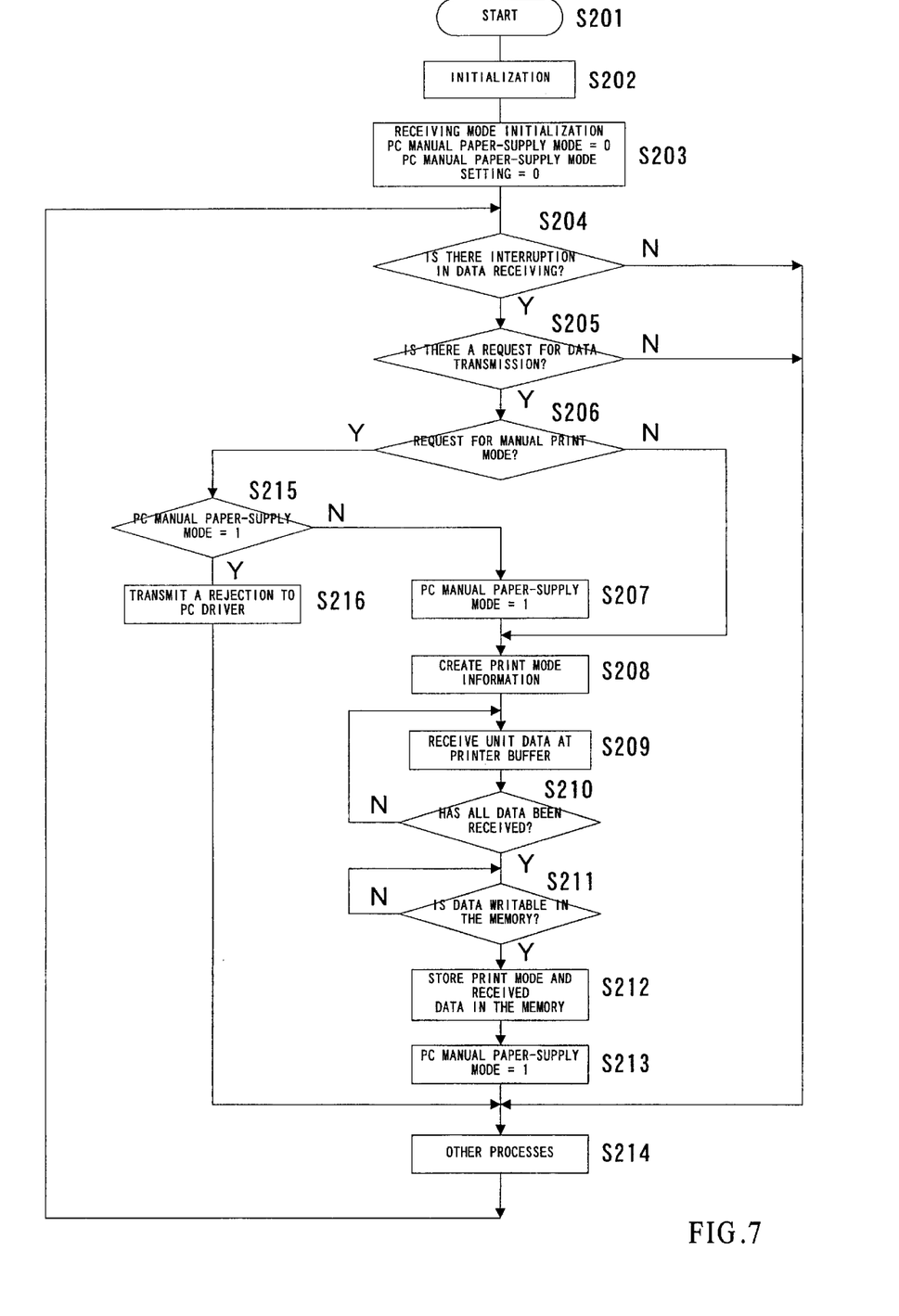
FIG. 7 is a flowchart showing the control operation for an external input device.

FIG. 7 is a flowchart of the main routine of the print control for the external computer PC performed by the controller 90 via the printer controller. This routine is performed by transferring the control data between the printer controller 92 and the controller 90.

In this example, the computer PC (i.e., the external apparatus) transmits a print request in the manual paper-supply mode (which is referred to as a PC manual paper-supply mode), and the controller 90 recognizes this PC manual mode and performs the print operation in the manual paper-supply mode. When the print request from the external computer PC which designates the manual paper-supply mode is received, the PC manual paper-supply mode is set in the photocopier 1. In this state, a new photocopy request in the same manual paper-supply mode will not be accepted. The details of which will be described later in connection with the system control operation.

In S201, the CPU is reset, and the program starts. In S202, initialization is performed, the RAM is cleared, and the various registers are set up. Then, the receiving mode is initialized in S203. In this step, PC manual paper-supply mode is reset, and the flags used to set the PC manual paper-supply mode are also reset, in addition to other initialization actions.

If the PC manual paper-supply mode flag has a value of 1 (which is indicated as "PC manual paper-supply mode=1" in the flowchart), it means that the PC manual paper-supply mode is currently being required. With the value of 1, the PC manual paper-supply mode needs to be set up based on the instruction from the external computer PC. If the PC manual paper-supply mode flag has a value of 0 (which is indicated as "PC manual paper-supply mode=0" in the flowchart, it means that the current job is not in the manual paper-supply mode, and the PC manual paper-supply mode does not have to be set up.

Then, the loop of the control operation of the printer controller starts. In S204, it is determined if there is an interruption in the received data. If an interruption occurs (i.e., YES in S204), it is further determined in S205 if the interruption is a request for transmission of print data. If YES in the determination of S205, it is determined if the request is a print request in the PC manual paper-supply mode in S206. If the print request is in the PC manual paper-supply mode (i.e., YES in S206), it is determined in S215 if the flag of the PC manual paper-supply mode is 1. If the PC manual mode flag is 1 (i.e., YES in S215), it means that a print job in the PC manual mode is being request by another computer PC. In this case, no new job in the PC manual mode is accepted in this embodiment until the previous job in the PC manual mode has been completed. Therefore, a rejection is transmitted to the print driver of the external computer PC in S217. Then, the process proceeds to S214, and other processes are performed. In this manner, a new print request in the PC manual mode is prohibited if another print request in the PC manual mode has already been accepted.

If the flag of the PC manual paper-supply mode is not 1 (i.e., NO in S215), this flag is set to 1 in S207. At this point of time, the print request in the PC manual mode is recognized and accepted by the main body of the photocopy machine. In S208, print-mode information designated by the print driver of the external computer PC are created. Then, in S209 and S210, the print data is received by unit by the printer buffer until all the data has been received. The received print data is stored in the printer buffer, and developed into image data. If the print request from the external computer is not in the PC manual mode in s206 (i.e., NO in S206), the process also proceeds to S208, and print mode information is created.

If all the data has been received (i.e., YES in S210), it is determined in S211 if the received data can be written in the image memory 30 of the photocopy machine. If the image memory 30 is not writable (i.e., NO in S211), data writing is delayed until the image memory 30 becomes writable and, in S212, the print mode information and the received data are written in the memory 30. Then, in S213, the flag of the PC manual mode is set to 1 in order to indicate the current job in the PC manual paper-supply mode. Other processes are executed in S214, and the process returns to S204.

If there is no interruption (i.e., NO in S204), or if there is no request for data transmission even if there is an interruption (i.e., NO in S205), the process jumps to S214, and other processes are executed. Then, the process returns to S204.

Figure 8:
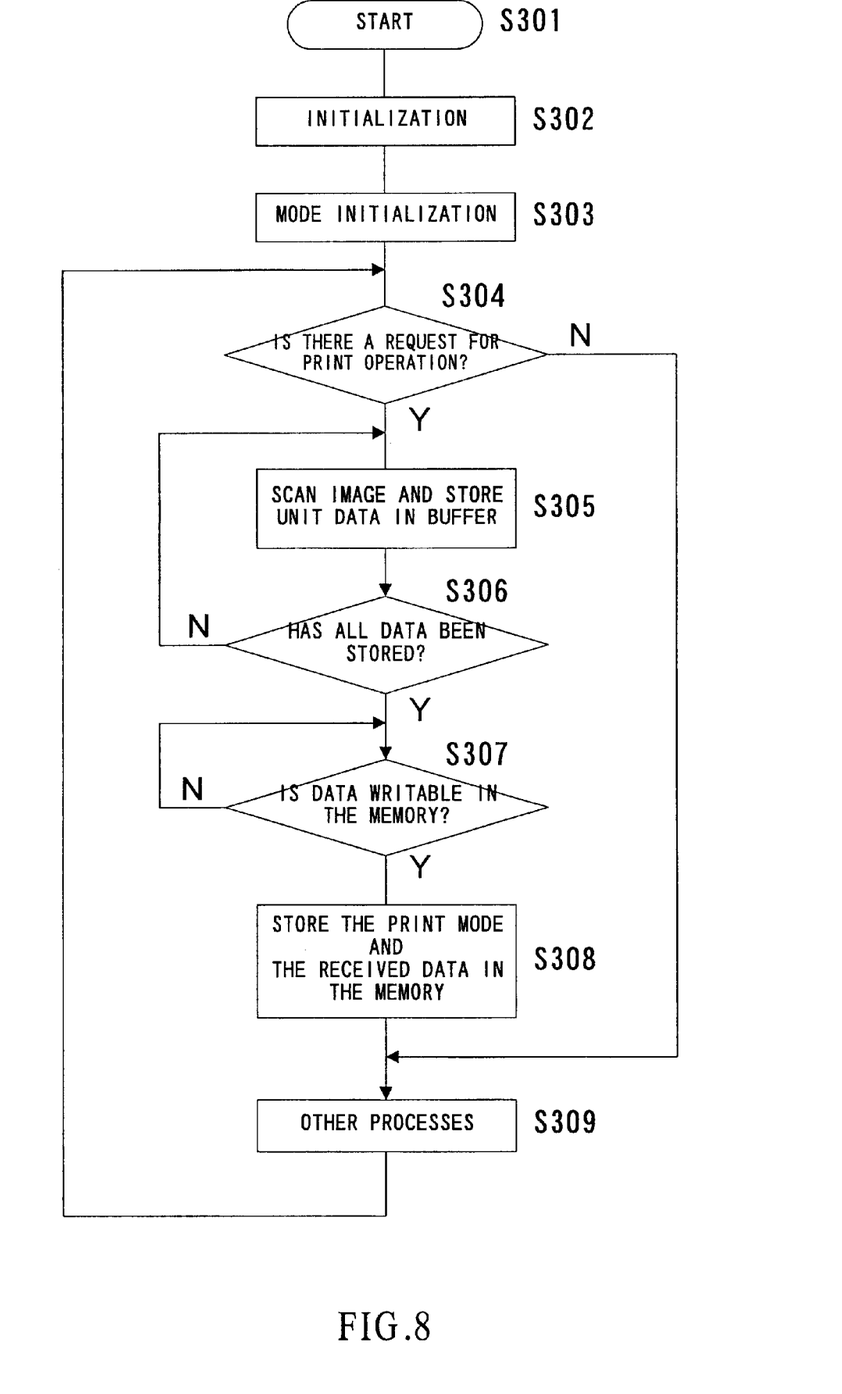
FIG. 8 is a flowchart showing the control operation for the built-in scanner.

FIG. 8 is a flowchart of the main routine for the scanner IR executed by the controller 90.

First, in S301, the CPU is reset, and the program starts. In S302, initialization is performed, the RAM is cleared, and the various registers are set up. Then, the mode is initialized in S303.

Then, the loop of the control operation for the scanner IR starts.

In S304, it is determined if there is a print request. If there is a request (i.e., YES in S304), the original is scanned in S305. The image data is read and stored by unit in the buffer. The image data is scanned until all the data have been stored in the buffer. If the scan has been completed (i.e., YES in the determination of S306), it is determined in S307 if the image data can be written in the image memory 30 of the photocopy machine. If the image memory 30 is not writable (i.e., NO in S307), data writing is delayed until the image memory 30 becomes writable and, in S308, the print mode information and the received data are written in the memory 30. Then, other processes are executed in S309, and the process returns to the beginning of the loop (S304).

In the determination in S304, it is again determined if there is a print request, which is to be output through the sub-routine of the input processing.

Figure 9:
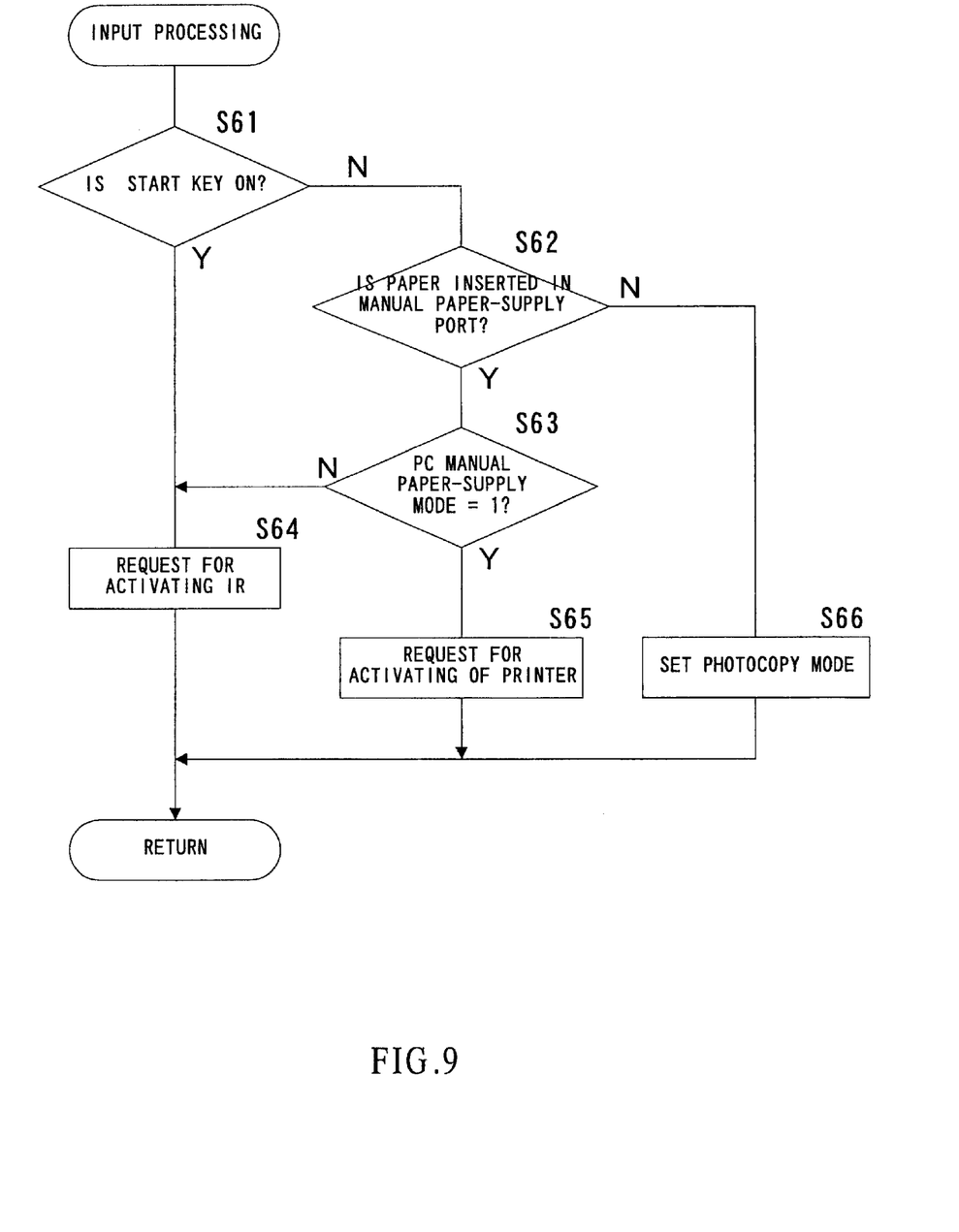
FIG. 9 is a flowchart showing the sub-routine of the input processing (S6) shown in FIG. 6.

FIG. is a flowchart showing the sub-routine of the input processing (S6) shown in FIG. 6. In this sub-routine, the inputs from the operation panel and other elements of the photocopier main body are processed.

First, in S61, it is determined if the start key has been pressed. If the start key has been pressed (YES in S61), a print request for activating the image scanner IR is output in S64. The presence of this print request is determined in S304 of FIG. 8, and based on the print request, the image scanner IR start reading the image of the original.

If the start key is not pressed (NO in S61), it is determined in S62 if paper has been inserted in the manual paper-supply port using the sensor SW1. If the sensor SW1 is on, it is regarded that a print request in the manual paper-supply mode has made. If the insertion of the paper is detected (YES in S62), it is determined if the PC manual paper-supply mode flag is 1 in S63.

If the PC manual paper-supply mode flag is not 1 (NO in S63), the print request from image scanner IR is output in S64, and the process return to S304 in order to start the photocopy action in the manual paper-supply mode. If the PC manual paper-supply mode flag is 1 (YES in S63), the print request from the external apparatus is output in S65 in order to start printing in the manual paper-supply mode. Thus, with the PC manual paper-supply mode flag of value 1, the print request from the image scanner IR in the manual paper-supply mode is suspended.

If the insertion of the paper in the manual paper-supply port is not detected in S62 (NO in S62), an appropriate photocopy mode is set up based on other input in S66, and the process returns.

Figure 10:
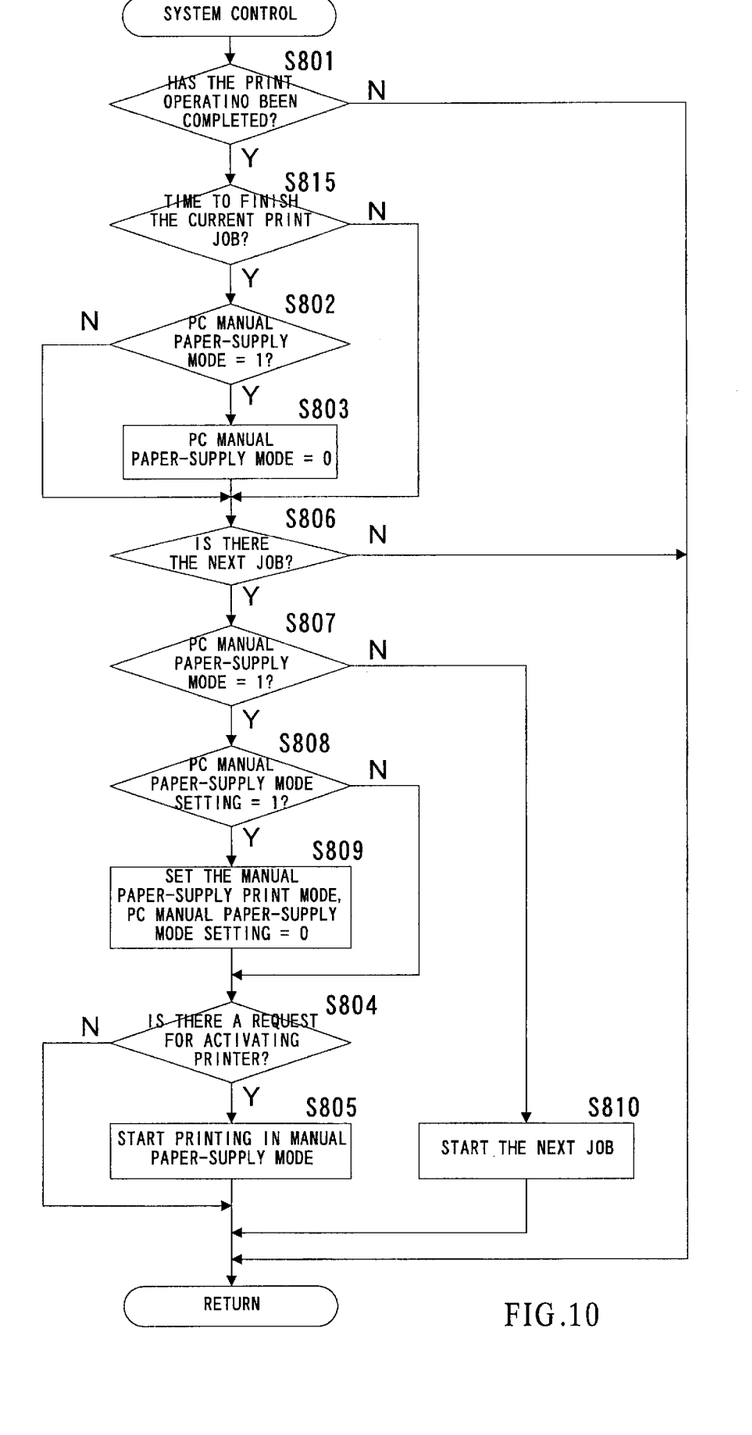
FIG. 10 is a flowchart showing the sub-routine of the system control (S8) shown in FIG. 6.

FIG. 10 is a flowchart showing the sub-routine of the system control (S8) shown in FIG. 6. In this sub-routine, a printing operation is started, and preparation for the next job is performed.

First, in S801, it is determined if the current printing job has been completed, If YES in the determination of S801, then it is determined in S815 if it is time to finish the current print job. This determination is made for the purpose of performing the steps S802 and S803 only once after the current print job is finished. If it is time to finish the current print job (YES in S815), then it is determined in S802 if the completed print job was executed in the PC manual paper-supply mode, in other words, if the PC manual paper-supply mode flag is 1. If YES in S802, the value of the PC manual paper-supply mode flag is reset to 0 in S803. If the PC manual paper-supply mode flag is not 1 (NO in S802), the process proceeds to S806. If it is not time to finish the current print job (NO in S815), the process also proceeds to S806.

In S806, it is determined if there is the next print job.

If there is not next print job (NO in S806), the routine returns. If there is the next print job (YES in S806), it is determined in S807 if the next job is requested in the PC manual mode. If YES in S807, it is determined in S808 if the mode is newly changed to the PC manual mode, in other words, if the PC manual paper-supply mode flag has a value 1. If YES in S808, the manual paper-supply print mode is set, and the value of the PC manual mode setting flag is reset to 0 in S809. Then, the process proceeds to S804. If the next job is requested in the PC manual paper supply mode (YES in S807), and if the mode is already in the PC manual print mode (NO in S808), then the process proceeds to S804 without performing S809.

In S804, it is determined if there is a request for activating the printer. Even if the value of the PC manual paper-supply mode flag is not 1, the same determination is made in S804. The request for activating the printer is generated when the paper is inserted in the manual paper-supply port in the input processing shown in FIG. 9, on condition that the PC manual paper-supply flag has a value of 1. This printer activation request is based on the print request from the external computer in the manual paper-supply mode. If there is a request for activating the printer (YES in S804), the image data supplied from the external computer via the printer controller 92 is recorded on the manually inserted paper in S805. Then, the routine returns.

If there is the next job (YES in S806), and if the next job does not require the PC manual paper-supply mode (NO in S807), then the printer is activated in order to execute the next print request as an ordinary print job except the PC manual paper-supply mode in S801.

If, in S801, it is determined that the current print job has not been completed (NO in S801), the process returns.

In this manner, the print request in the PC manual paper-supply mode input from the external computer is recognized and executed by the photocopy machine 1.

Although, the present invention has been described using an example in which the PC manual mode is designated by the external computer PC, the PC manual mode can be designated from the main body of the photocopy machine 1 by providing a PC manual mode key in the operation panel shown in FIG. 2.

Figure 11:
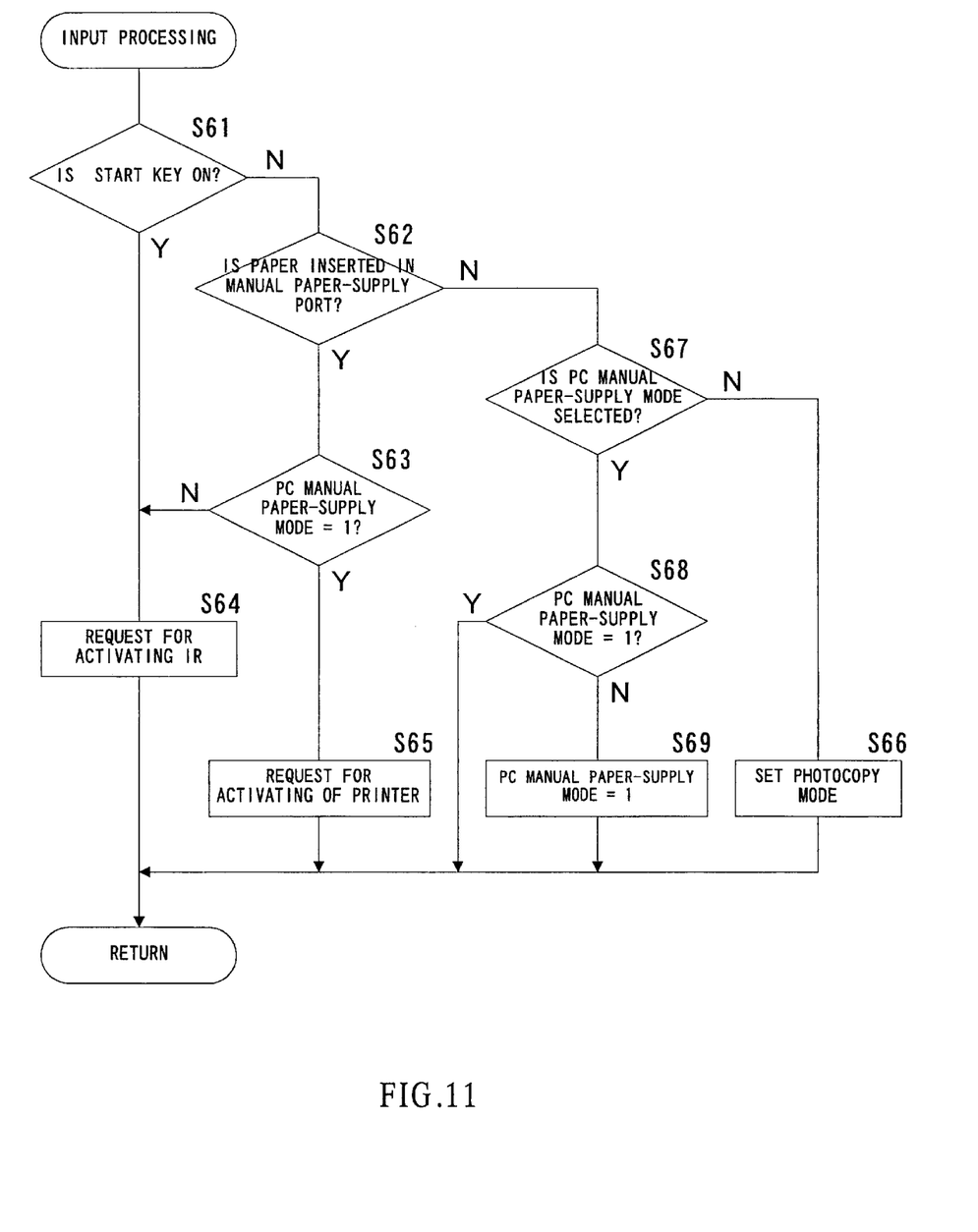
FIG. 11 is a flowchart showing another example of the sub-routine of the input processing (S6) shown in FIG. 6.

In this case, the sub-routine of the input processing shown in FIG. 9 is modified to the flowchart shown in FIG. 11.

In FIG. 11, it is determined if the input request is caused by pressing the start key in S67. If YES in the determination of S67, it is determined in S68 if the PC manual paper-supply mode flag has a value of 1. If the value is not 1 (NO in S68), the value of the PC manual paper-supply mode flag is set to 1 in S69, whereby the PC manual paper-supply mode is selected. Then, the routine returns. If the PC manual paper-supply mode flag has a value of 1 (YES in S68), the routine returns.

If the PC manual paper-supply mode is not selected in the photocopy machine 1 (NO in S67), the process proceeds to S66.

These steps S61 through S66 are the same as those shown in FIG. 9, and therefore, the explanation will be omitted.

In the embodiment described above, a single-paper-detection type manual paper-supply port, which detect the insertion of a single paper, is used. Upon the detection, the single paper is supplied to the paper transportation path and the printer is activated. However, a multiple-paper-detection type manual paper-supply port may be used. In this case, a plurality of papers can be inserted in the manual-paper-supply port at a time, and the papers are successively supplied in response to the manipulation of the print start key or the print requests input from the external apparatuses. The operation flow using the multiple-paper-detection type paper-supply port is shown in FIG. 12.

Figure 12:
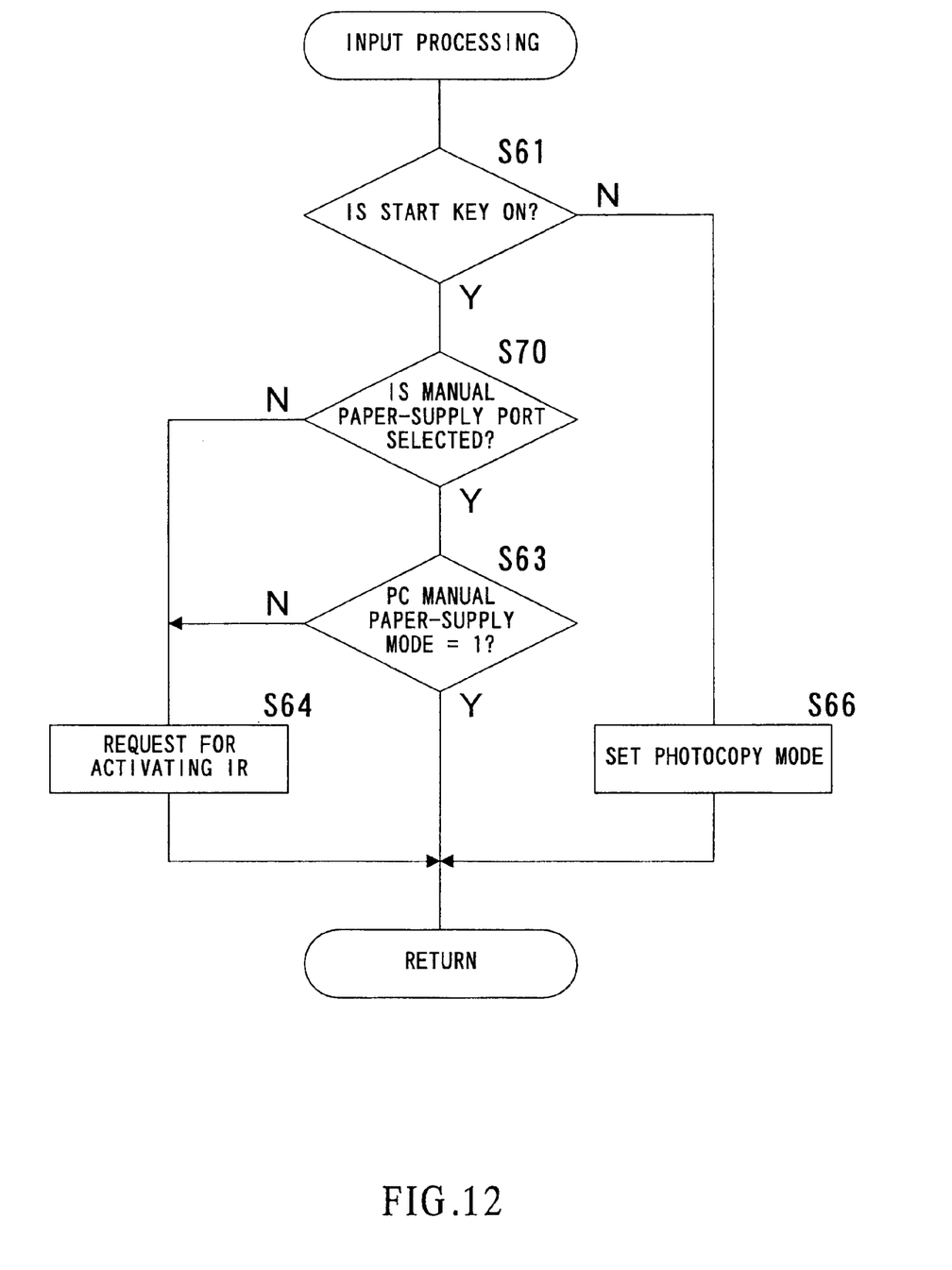
FIG. 12 is a flowchart showing still another example of the sub-routine of the input processing (S6) shown in FIG. 6.

In FIG. 12, it is first determined in S61 if the start key has been pressed. If the start key has been pressed (YES in S61), it is further determined in S70 if the manual paper-supply port is currently selected. The manual paper-supply mode can be selected through the operation panel. If the manual paper-supply port is selected (YES in S70), if is determined in S63 if the PC manual paper-supply mode flag has a value of 1. If the value of the PC manual paper-supply mode flag is not 1 (NO in S63), the photocopy request from the image scanner IR is output in S64, and the photocopy request is accepted. If the PC manual paper-supply mode flag is 1 (YES in S63), the process returns without accepting the photocopy request from the image scanner IR. If the manual paper-supply port is not selected in S70 (NO in S70), the photocopy request from the image scanner IR is output in S64, and the photocopy request is accepted. If the start key has not been pressed (NO in S61), the process jumps to S66, in which the photocopy mode is set. This step S66 is the same as S66 shown in FIG. 9.

Thus, if the PC manual paper-supply mode is already selected, other print request or photocopy request in the manual paper-supply mode is not accepted until the current job in the PC manual paper-supply mode has been completed.

In addition to the means for allowing the PC manual mode for the external computer to be designated through the operation panel of the photocopy machine 1, means for allowing the photocopier job (i.e., the job for the photocopy machine itself) to be executed in the manual paper-supply mode may be provided. In this case, the operation flow shown in FIG. 11 is modified so that when the PC manual mode selection key is pressed, a screen for selecting the PC job (from the external computer) or the photocopier job (from the photocopy machine itself) is displayed. If the PC job is selected through this screen, the value of the PC manual paper-supply mode flag is set to 1.

If the PC manual mode is designated from the operation panel of the photocopy machine 1, a job number may be generated. In this case, means for allowing the job number to be designated from the external computer may be provided. In particular, a job-number management table, which can be referred from the system controller and the scanner controller, which are built in the main controller 90, and from the printer controller 92, is provided. This job-number management table is referred to when the start key on the operation panel of the photocopy machine 1 is pressed, when a printing job is received by the printer controller 92, and when a printing job is input from an external apparatus, and a new job number is assigned to the requested printing job. Every time a job number is assigned, the management table is updated. If the current printing job is completed, the image data of that job stored in the memory is discarded, and the management table is updated. As to the printing job requested from the external computer PC, the job-number information is added to the data transmitted from the external computer PC, and only if the job-number information coincides with the job number which designates the PC manual mode, the system is brought into the PC manual mode.

In addition, a part of a printing job may be executed in the PC manual paper-supply mode, while the rest of the job is executed in a different mode using a different paper-supply port. In this case, a controller for escaping from the PC manual paper-supply mode within the printing job may be provided. In operations, when a page of printing job in the PC manual mode is finished, it is determined if the next page also requires the PC manual mode. If NO in this determination, this printing job escapes from the PC manual mode (i.e., the value of the PC manual paper-supply mode flag is set to 0).

Conversely, a controller for entering the PC manual paper-supply mode halfway in a print job may be provided if that print job includes the image data designating the manual paper-supply mode and other data using other paper-supply port. In this case, in operations, when a page of printing job in the automatic mode is finished, it is determined if the next page of this printing job requires the PC manual mode. If YES in this determination, the value of the PC manual paper-supply mode flag is set to 1.

Although the embodiment of the invention has been described using an example in which the specific mode is the PC manual mode, the invention is not limited to this example.

This invention can be applied to any types image forming apparatuses having multiple functions. The image forming apparatus according to the invention can recognize and promptly execute a print request in a specific mode supplied from an external apparatus, while a new print request in that specific mode is suspended until the former print request has been executed. Since the print request (without containing the image data) from the external apparatus is distinguished from a photocopy request in the same mode, but supplied from the built-in input unit, this external request is independently executed without being incorporated in the waiting matrix of the internal print requests from the built-in input means. Thus, the operability of both the image forming apparatus and the external apparatus are improved.

Furthermore, a print request in a specific mode can be independently executed based on the instruction from either the external apparatus or the image forming apparatus itself, while other photocopy request in the same specific mode input from the built-in input unit was suspended until the print request has been executed.

If the specific mode is a PC manual paper-supply mode using a manual paper-supply port in which a desired size of paper can be inserted, the print job in the PC manual mode requested from the external apparatus is accepted independently of the image recording request from the image forming apparatus itself, and is executed efficiently. This is a big advantage because the convenience in the manual paper-supply mode is greatly improved. Once a print request in the PC manual paper-supply mode from the external apparatus is accepted, other print request in the same mode is withheld until the current print job in the PC manual paper-supply mode has been completed, in order to reliably execute the current print job in that mode.

While the invention has been described by way of an exemplary embodiment, it is understood that many changes and substitutions may be made by those skilled in the art with without departing from the spirit and the scope of the invention, which is defined by the appended claims.

What is claimed is:

1. An image forming apparatus capable of accepting a new image data-output request during an output operation of image data stored in a memory, said image forming apparatus, comprising:
   an output device for outputting the image data stored in said memory;
   a built-in input device for inputting image data to said memory;
   an external input device for inputting image data supplied from an external apparatus to said memory; and
   a controller in which a prohibition of acceptance of a new data-output request in a specific operation mode is initiated when image data supplied from said external input device is to be output in the specific operation mode.

2. The image forming apparatus according to claim 1, wherein said controller judges whether a current data-output request supplied from said external input device is in the specific operation mode, and determines to prohibit the acceptance of the new data-output request if the current data-output request is in the specific operation mode.

3. The image forming apparatus according to claim 1, further comprising a manipulation designation key for designating the current data-output request to be in the specific mode, and said controller determines that the current data-output request is in the specific mode based on the manipulation designation key.

4. The image forming apparatus according to claim 1, wherein said output device is a printer for forming an image on a sheet.

5. The image forming apparatus according to claim 4, wherein said printer has a plurality of paper-supply ports, and the specific operation mode is an operation mode which uses a specific paper-supply port among the plurality of paper-supply ports.

6. The image forming apparatus according to claim 5, wherein said specific paper-supply port is a manual paper-supply port in which a desired size of paper can be inserted.

7. The image forming apparatus according to claim 6, further comprising a second controller for detecting the insertion of the paper in the manual paper-supply port, and for activating the printer upon the detection.

8. The image forming apparatus according to claim 1, wherein. the new data-output request prohibited by said controller is a request for outputting the image data supplied from said external input device.

9. The image forming apparatus according to claim 1, wherein the new data-output request prohibited by said controller is a request for outputting the image data supplied from said built-in input device.

10. The image forming apparatus according to claim 1, wherein said built-in input device is an image reader for reading an image from the original and acquiring the image data.

11. The image forming apparatus according to claim 1, wherein said output device outputs a plurality of image data supplied from said external input device as a single job, and said controller prohibits the acceptance of the new data-output request in the specific operation mode until the image data having a designation of said specific operation data is output within the single job.

12. The image forming apparatus according to claim 1, wherein the built-in input device generates the image data that is input to the memory.

13. An image forming apparatus having a printer with a plurality of paper-supply ports and being capable of accepting a new data-output request from an external apparatus during a printing operation of the printer, said image forming apparatus, comprising:
   a receiver for receiving a print request designating a specific paper-supply port supplied from the external apparatus; and
   a controller for prohibiting the acceptance of a new print request designating said specific paper-supply port, if there is a previously received print request designating said specific paper-supply port, until the previously received print request has been completed, and for allowing the acceptance of a new print request designating another paper supply port.

14. The image forming apparatus according to claim 13, wherein said specific paper-supply port is a manual paper-supply port in which a desired size of paper can be inserted manually.

15. The image forming apparatus according to claim 14, further comprising a second controller for detecting the insertion of the paper in the manual paper-supply port, and for activating said printer upon the detection.

16. The image forming apparatus according to claim 14, further comprising a print start key provided to a main body of said image forming apparatus, and a second controller for activating said printer in response to the manipulation of said print start key.

17. The image forming apparatus according to claim 13, further comprising an image reader for reading an image from the original and acquiring the image data.

18. The image recording apparatus according to claim 17, wherein said controller prohibits acceptance of a new print request designating a specific paper-supply port supplied from said image reader.

19. An image recording apparatus having a copy function for printing an image read out from an original, and a print function for printing an image data supplied from an external apparatus, said image recording apparatus, comprising:

data receiving means for receiving a print request designating a specific paper-supply port supplied from an external apparatus;

determination means for determining, when a copy request in the copy function occurs during the printing of the image data supplied from the external apparatus, if the copy request designates said specific paper-supply port; and a controller for prohibiting an acceptance of the copy request if it was determined by said determination means that the copy request designates said specific paper-supply port, and for allowing the copy request to be accepted if it was determined that the copy request does not designate said specific paper-supply port.

20. The image recording apparatus according to claim 19, wherein said specific paper-supply port is a manual paper-supply port capable of receiving arbitrary sizes of papers.

21. The image recording apparatus according to claim 19, wherein when said controller recognizes a new print request designating said specific paper-supply port input from the external apparatus, said controller prohibits an acceptance of the new print request designating a specific paper-supply port supplied from the external apparatus.

* * * * *